US008462108B2

(12) United States Patent
Moore et al.

(10) Patent No.: US 8,462,108 B2
(45) Date of Patent: Jun. 11, 2013

(54) SCENE LAUNCHER SYSTEM AND METHOD USING GEOGRAPHICALLY DEFINED LAUNCH AREAS

(75) Inventors: John S. Moore, Middleton, WI (US); Victor W. Marsh, Madison, WI (US); Benjamin T. Zimmerman, Monona, WI (US)

(73) Assignee: Weather Central LP, Madison, WI (US)

( * ) Notice: Subject to any disclaimer, the term of this patent is extended or adjusted under 35 U.S.C. 154(b) by 745 days.

(21) Appl. No.: 12/393,232

(22) Filed: Feb. 26, 2009

(65) Prior Publication Data

US 2010/0026901 A1     Feb. 4, 2010

Related U.S. Application Data

(63) Continuation-in-part of application No. 11/110,356, filed on Apr. 20, 2005, now Pat. No. 7,800,582.

(60) Provisional application No. 60/564,181, filed on Apr. 21, 2004, provisional application No. 61/067,170, filed on Feb. 26, 2008.

(51) Int. Cl.
*G06F 3/33*     (2006.01)

(52) U.S. Cl.
USPC .......... 345/157; 345/158; 345/160; 345/163; 345/165; 345/167

(58) Field of Classification Search
USPC ............. 345/1.1–9, 156–183, 419, 420, 473, 345/620, 629, 632, 738, 857, 862; 348/500, 348/586, 598, 587, 746; 725/37, 116, 47, 725/143; 702/2, 3, 200, 300, 400; 707/2–4, 707/10, 102, 104.1
See application file for complete search history.

(56) References Cited

U.S. PATENT DOCUMENTS

| 5,583,792 | A | * | 12/1996 | Li et al. .......................... 709/224 |
| 5,583,972 | A | * | 12/1996 | Miller ............................ 345/419 |
| 5,848,378 | A | * | 12/1998 | Shelton et al. .................... 702/3 |
| 6,240,369 | B1 | * | 5/2001 | Foust ................................ 702/3 |
| 6,266,063 | B1 | * | 7/2001 | Baron et al. ................... 345/419 |
| 6,335,765 | B1 | * | 1/2002 | Daly et al. ..................... 348/586 |
| 6,384,830 | B2 | * | 5/2002 | Baron et al. ................... 345/473 |
| 6,606,127 | B1 | * | 8/2003 | Fang et al. ..................... 348/500 |
| 6,683,609 | B1 | * | 1/2004 | Baron et al. ................... 345/419 |
| 6,961,061 | B1 | * | 11/2005 | Johnson et al. ................ 345/473 |
| 7,250,945 | B1 | * | 7/2007 | Scaman et al. ................. 345/420 |
| 7,313,810 | B1 | * | 12/2007 | Bell et al. ...................... 725/116 |
| 7,348,895 | B2 | * | 3/2008 | Lagassey ....................... 340/907 |

(Continued)

*Primary Examiner* — Prabodh M Dharia
(74) *Attorney, Agent, or Firm* — Meunier Carlin & Curfman, LLC

(57) ABSTRACT

A computer-implemented method of defining and presenting a presentation including a plurality of scenes and a presenter appearing in the scenes. The method includes defining a first scene including a geographic background, receiving geographic location information and remote video and/or data information from a remote site, and defining within the first scene a launch area within the geographic background corresponding to the geographic location information. The method further includes associating a destination scene with the defined launch area. The method yet further includes displaying the destination scene in place of the first scene when the presenter provides a scene change signal with the pointing element located at the defined launch area in the first scene, wherein the destination scene displayed is a background scene generated based on remote video and/or data information received from the remote site.

20 Claims, 10 Drawing Sheets

U.S. PATENT DOCUMENTS

| | | | |
|---|---|---|---|
| 7,349,830 B2* | 3/2008 | Gilbert et al. | 703/2 |
| 7,421,422 B1* | 9/2008 | Dempster et al. | 1/1 |
| 7,705,769 B2* | 4/2010 | Kelly et al. | 342/26 R |
| 2001/0017623 A1* | 8/2001 | Baron et al. | 345/419 |
| 2003/0030622 A1* | 2/2003 | Vaarala | 345/158 |
| 2005/0110801 A1* | 5/2005 | Lin | 345/620 |
| 2005/0140832 A1* | 6/2005 | Goldman et al. | 348/746 |
| 2006/0001668 A1* | 1/2006 | Johnson et al. | 345/473 |
| 2006/0092043 A1* | 5/2006 | Lagassey | 340/907 |
| 2006/0209090 A1* | 9/2006 | Kelly et al. | 345/632 |
| 2011/0074814 A1* | 3/2011 | Kelly et al. | 345/629 |

* cited by examiner

SCENE LAUNCHER SYSTEM AND METHOD USING GEOGRAPHICALLY DEFINED LAUNCH AREAS

CROSS-REFERENCE TO RELATED APPLICATIONS

This application is a continuation-in-part of U.S. patent application Ser. No. 11/110,356 (now U.S. Pat. No. 7,800,582), filed Apr. 20, 2005, entitled Scene Launcher System and Method for Weather Report Presentation and the Like, which claims the benefit of U.S. Provisional Patent Application No. 60/564,181, filed Apr. 21, 2004, entitled Scene Launcher System and Method for Weather Report Presentation and the Like, the entire disclosures of which are incorporated herein by reference.

This application claims the benefit of U.S. Provisional Patent Application No. 61/067,170, filed Feb. 26, 2008, entitled Scene Launcher System and Method Using Geographically Defined Launch Areas and Automatic Positioning of Information Display in a Video Field to Prevent Blocking by On-Screen Presenter, the entire disclosure of which is incorporated herein by reference.

FIELD OF THE INVENTION

The present invention pertains generally to systems and methods for generating and presenting multimedia presentations, such as live televised weather report presentations, and, more particularly to systems and methods for generating and presenting such presentations wherein a live on-screen presenter appears and interacts with computer generated and/or other graphics and/or text in a presentation scene.

BACKGROUND OF THE INVENTION

Various systems and methods have been developed for providing viewers of broadcast and cable television weather presentations with informative and accurate weather information. Typically, such systems provide a display of representations of weather phenomena, e.g., clouds, rain, storms, etc., overlaid on a map of a geographical area of interest. Such displays were originally created by drawing representations of weather phenomena, or placing pre-made weather phenomenon symbols, on a physical map of an area of interest. The image of the map was then broadcast to viewers, usually with a weather presenter positioned in front of the map to provide an explanation of the map display. Computer systems now are employed to facilitate the generation of weather report displays, using computer-generated graphics and animation.

A typical computer-implemented system for preparing a weather presentation will include detailed digital maps of geographic areas of interest stored for access by the computer. Weather information, such as satellite imagery and/or weather radar information, such as NEXRAD weather radar information provided by the government or live local radar data, is provided to the system. The system scales the received weather information, which is then overlaid on the digital maps to create a graphic display of the weather for a particular area of interest. Weather information received by the system may be processed to generate weather symbols, color contours, or other representations of the weather information that are overlaid on the digital maps to create the weather display. A series of such weather displays may be generated by the computer system, and played back in sequence to provide an animated image of the movement of weather phenomena through a geographic area. Such systems may provide an operator with various tools for selecting, e.g., the geographic location to be displayed, reference points to be displayed on the geographic map, e.g., cities, roads, borders, etc., the source of the weather information to be displayed on the geographic map, e.g., satellite imagery or radar, and how the weather information will be represented, e.g., symbols, color contours, etc. Weather forecast displays are generated in a similar manner using weather forecast information obtained from various sources, such as, for example, weather forecast models.

Using a system as described above, a series of scenes may be generated that are combined to form a complete weather report presentation of past, present, and/or future weather conditions for one or more geographic areas of interest to the viewers thereof. Typically at least a portion of such a weather presentation, i.e., at least some of the computer generated scenes forming the presentation, are presented to viewers by an on-screen weather presenter who appears in front of or as part of the computer generated scene while explaining the information presented therein. This affect is achieved by positioning the weather presenter in front of a background screen of a particular background color, e.g., typically a green or blue screen. A camera captures the image of the presenter in front of the screen and provides that image to a computer which replaces each picture element (pixel) in the camera image having the background screen color with a corresponding pixel from the computer generated weather presentation scene. Thus, the weather presenter appears in the computer generated scene in the weather report presentation. This combined scene, with the weather presenter appearing in the computer generated scene, is provided on a monitor that is visible to the presenter so that the presenter can coordinate his position and movements in real space with the computer generated scene, e.g., to point out to viewers specific areas of interest in the computer generated scene.

In some more advanced weather report presentation systems of this type the on-screen weather presenter is able to interact with the computer generated scene in which the presenter appears. For example, in such systems, by movement of the presenter's hand or other part of the body, or of a pointing device held by the presenter, the presenter may draw lines, cause computer generated objects to appear or disappear, and/or move such objects around on the computer generated scene in which the presenter appears. This effect preferably is achieved by analyzing the image obtained by the camera of the presenter in front of the background screen to find and track the position of a pointing element, e.g., the presenter's hand, in the field of view of the camera. Exemplary systems and methods for tracking a pointing element in a video field in this manner are described, for example, in U.S. Pat. Nos. 5,270,820, 5,699,442, and 6,549,659.

In conventional systems and methods for the presentation of weather report presentations the on-screen presenter typically holds a communication device in his hand during the presentation. (In some systems this communication device may be implemented, alternatively or additionally, as a device operable by the on-screen presenter using his foot.) The communication device typically includes several buttons and is in communication, either via a wired or a wireless link, with the presentation computer system. The on-screen presenter uses this communication device to send signals to the computer system during the presentation to indicate that certain actions are to be taken or changes to the presentation are to be made. For example, in systems where the tracking of a pointing element, e.g., the onscreen presenter's hand, in the video field is used to allow the presenter to interact with the scene in which he appears, the communication device may be used by the presenter to indicate which action is to occur at the location identified by the pointing element. For example, the presenter may push a button on the communication device to indicate that a line should be drawn in the scene beginning at the current position of the pointing element. Pushing another button on the communication device may indicate that an icon or other graphic is to appear in the scene at the location indicated by the pointing element. The specific action to be taken in response to a particular signal generated by the communication device at a particular point in the presentation is pre-programmed in the system.

A conventional use of the communication device by the on-screen presenter is to indicate that the next scene in the presentation is to be displayed. This allows the presenter to sequence through a series of scenes which form the presentation at the pace desired by the presenter while maintaining the presenter's position on-screen and thus in or as part of the presentation itself. Thus, using the communication device, the on-screen presenter controls the progress of the presentation, scene to scene. A limitation of conventional presentation systems and methods of this type is that the sequence of scenes in which the presenter is to appear must be pre-scripted. During the presentation, the on-screen presenter, using the communication device, controls the timing of the scene sequence, i.e., using the communication device he can determine when to proceed to the next scene. However, since the sequence of scenes is predetermined, the onscreen presenter is able to proceed only linearly, scene by scene, through the pre-scripted presentation.

What is desired is a system and method for the generation and presentation of presentations, such as weather report presentations, where an on-screen presenter is able to interact with the presentation scenes in which the on-screen presenter appears to select for display or launch one of several possible different next subsequent scenes from the current scene being presented, thereby to proceed through such a presentation by presenting a sequence of scenes in a non-linear manner.

SUMMARY OF THE INVENTION

The present invention provides a system and method for generating and presenting a presentation in which an on-screen presenter is able to control the sequence of scenes forming the presentation in a nonlinear manner. In accordance with the present invention, an on-screen presenter appears in front of or as part of a computer or other generated scene, e.g., as part of a weather report presentation. Within the computer generated scene a plurality of launch points or areas are defined. Each such launch area is associated with another and different computer or other generated destination scene for the presentation. A conventional system and method is used to track a pointing element, e.g., the onscreen presenter's hand, as the pointing element is moved through an on-camera video field to indicate locations within the displayed scene. The on-screen presenter is able to jump to or launch the next scene to be presented in the presentation by moving the pointing element in space to an area in the current scene corresponding to a launch area and indicating that the scene corresponding to that launch area is to be displayed by providing a signal using a communication device. Similar launch point areas, each associated with other scenes that may be presented, may be provided in the destination scene thus displayed in response to the on-screen presenter's request. In this manner, an on-screen presenter may control not only the timing of when the next scene in a presentation is to be displayed but also which scene is to be displayed in a non-linear manner.

The present invention preferably is implemented in a computer based system. For example, the present invention may be implemented as part of a computer based system that provides the ability, in a conventional manner, to generate and/or store a variety of computer or other generated scenes from which a presentation, such as a weather report presentation, is to be formed. During the presentation of such a presentation, an on-screen presenter is positioned in front of a screen having a defined background color. A video camera obtains an image of the presenter in front of the background color screen in a conventional manner. This image is provided to the computer system and combined with the scenes for the presentation to generate images of the on-screen presenter in front of or within a scene. The image of the on-screen presenter in front of the background color screen also is analyzed by the computer system, using a conventional method for locating a pointing element within the camera image video field, to track the movement of a pointing element, such as the presenter's hand, in the image. A communication device, e.g., a hand held communication device with one or more buttons, is connected, either via a wired or wireless connection, to the computer system. The communication device is operated by the on-screen presenter to indicate to the computer system that an action is to be taken. The action to be taken depends upon the tracked position of the on-screen presenter's pointing element in the video field. A monitor preferably is provided in a position visible to the on-screen presenter to present to the presenter the combined image of the presenter within the presentation scene, so that the on-screen presenter is able to coordinate his movements and positions within the scene. The computer system may be connected to a conventional television or other broadcast system for broadcasting the resulting presentation, e.g., a weather report presentation, generated thereby.

In accordance with the present invention, the scenes forming a presentation, e.g., a weather report presentation, in which an on-screen presenter is able to control the sequence of display of the scenes forming the presentation in a non-linear manner, are defined by an operator in a build mode of operation. In this mode of operation the operator first defines or selects an initial scene for the presentation in which the on-screen presenter will appear. A plurality of areas within the first scene are defined as launch areas. These launch areas may be of any size and/or shape and positioned at any position within the first scene. Each such launch area is associated with a destination scene, i.e., a scene that will be launched or displayed when the associated launch area is selected by the on-screen presenter. For each such destination background scene, in turn, launch areas as described may be defined and associated with subsequent destination scenes. This process may be repeated for each scene forming the presentation, with the scene definitions, including launch points and associated destination scene definitions, stored in a presentation database. Various graphical user interface tools may be provided to an operator of the system to facilitate the definition of presentation scenes in accordance with the present invention during the build mode of operation.

In an alternative embodiment, the locations of launch areas may be determined and indicated on a map background appearing in a video field based on a geographic location. For example, such a geographic location may be a fixed site, such as the location of a fixed sky camera of remote weather station, or of a movable site, such as a weather chasing vehicle. The geographic location of the site may be known or determined dynamically during the presentation. For example, the geographic location of a weather chasing vehicle may be determined dynamically using a global positioning system (GPS) or other device on the vehicle and fed, via an appropriate communications channel, to the studio where the presentation is being presented. A launch area icon may be positioned automatically on the map background scene at a location thereon corresponding to the geographic position (e.g., latitude and longitude) of the remote site. This launch area icon may move in position in the background scene as the remote site moves, e.g., by moving the icon in the background scene or by keeping the launch area in a fixed position in the video field and moving the background map on which it is displayed. Alternatively, a fixed geo-located launch point may also be fixed to a map location, such that the launch point will move relative to the video window if the map is moved relative to the window. For example, a launch point in San Francisco would appear to move when the camera is panning across the earth along, for example, the West Coast. Data and/or video received from the remote site may be used to generate a video scene or graphics that is launched for display when the corresponding launch area is selected by an on screen presenter.

During the presentation of a presentation in accordance with the present invention the on-screen presenter is positioned in front of the background color screen. The presenter is provided with the communication device, e.g., a multi-button signaling or communication device held by the presenter in his hand, a push button on the floor activated by the presenter's foot, a touch sensitive panel mounted to the green screen wall, etc. The video image of the on-screen presenter in front of the background color screen is captured and combined with the first scene in the presentation in a conventional manner to provide a combined video image of the on-screen presenter in front of or within the first scene. This combined image is provided on a monitor as feedback to the on-screen presenter, so that the on-screen presenter is able to coordinate his movements and positions within the scene in which the presenter appears. The image of the presenter in front of the background color screen also is analyzed to track the location of a pointing element, e.g., the presenter's hand, within the video field. As the onscreen presenter moves the pointing element into a location in space corresponding to a position in the scene corresponding to a launch area the operator may be provided with an indication, e.g., an icon, appearing on the monitor, to indicate that a launch area has been located. With the pointing element positioned in a location corresponding to a launch area, the on-screen presenter may indicate that a scene change is to be made by using the hand held-communication device, e.g., by pushing the appropriate button on the device. In response to this scene change signal, the system launches a new scene of the presentation to replace the current scene, with the specific scene launched being the destination scene associated with the launch area indicated by the onscreen presenter. The on-screen presenter may repeat this procedure with the second and subsequent scenes, thereby proceeding through a sequence of scenes to present the presentation in a non-linear manner. Thus, the on-screen presenter controls both the timing of scene changes in the presentation as well as the scenes forming the presentation and the sequence thereof.

In a further alternative embodiment, the specific scene or graphic to be launched in response to the on-screen presenter's selection may be displayed automatically in an area of the video field such that key scene elements are not blocked by the on-screen presenter. Key scenes and graphics to be presented in this manner may be tagged as such at the time they are created. Key areas of such scenes may be designated. During the presentation, the position of the on-screen presenter in the video field is determined. For example, the system may track the position of the presenter in the video field to determine whether the presenter is in the right half or left half of the video field. At the time that the selected background scene or other graphic is launched, the scene or graphic is displayed positioned in the video field such that key elements are displayed in a portion of the video field where the presenter is not. For example, if the presenter is determined to be positioned in the right half of the video field, the scene or other graphic is displayed in the background such that the key scene elements are displayed in the left half of the video field.

Further objects, features and advantages of the present invention will be apparent from the following detailed description taken in conjunction with the accompanying drawings.

DETAILED DESCRIPTION OF THE INVENTION

The present invention provides a scene launcher system and method for use in the generation and presentation of presentations such as video and other multi-media presentations. In accordance with the present invention, an on-screen presenter appears as part of the presentation and is able to control the timing and sequence of scenes forming the presentation, and in which the on-screen presenter appears, in a non-linear manner. The present invention will be described in detail herein with reference to the exemplary application thereof to the generation and presentation of a televised or otherwise broadcast weather report presentation. It should be understood, however, that the present invention also may be applicable to other types of video and other presentations in which an on-screen presenter appears within or as part of computer or otherwise generated scenes and interacts therewith to control or alter the presentation.

Figure 1:
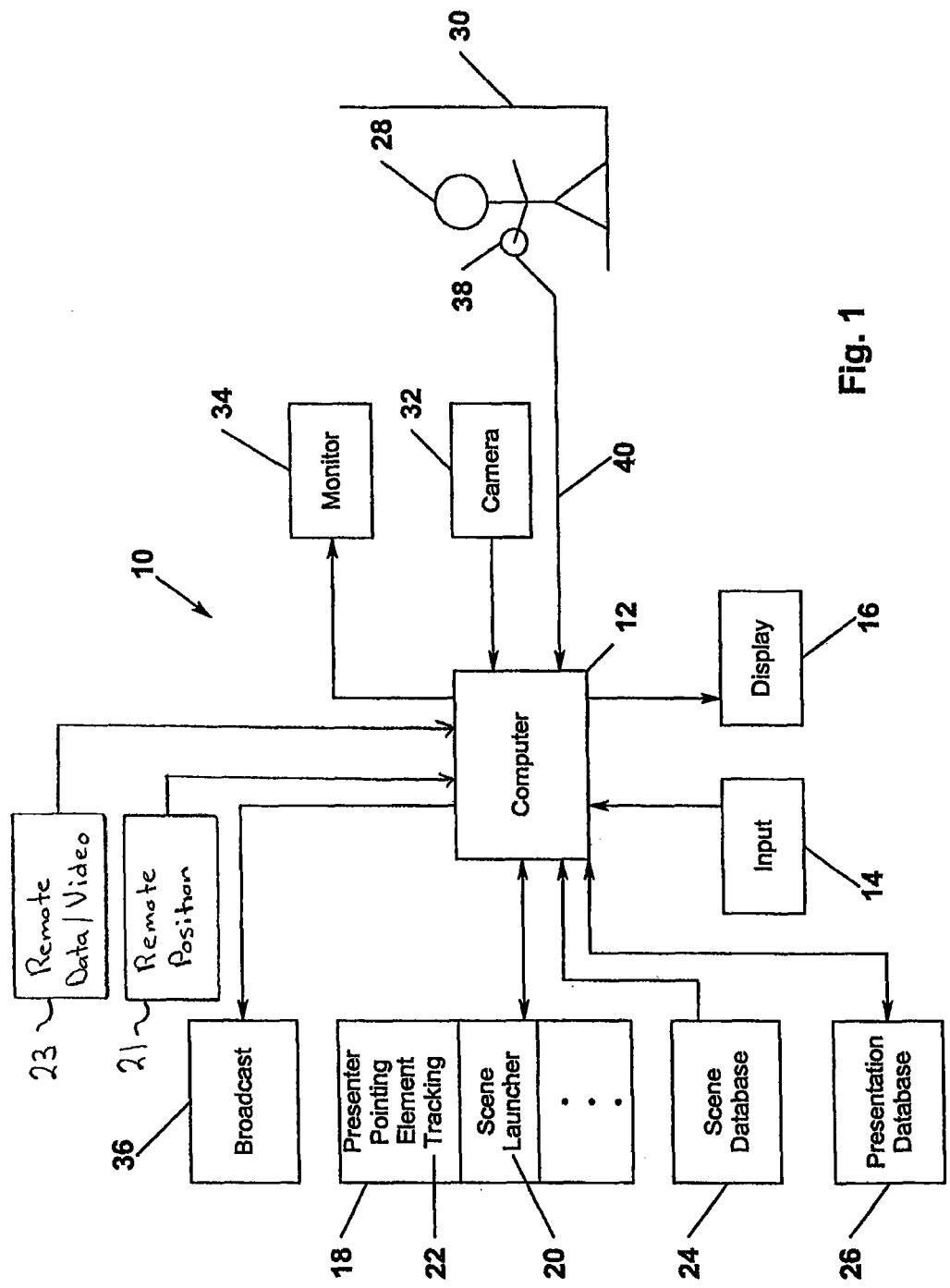
FIG. 1 is a schematic block diagram of an exemplary computer-based system for implementing a scene launcher system and method in accordance with the present invention.

An exemplary system 10 in which a scene launcher system and method in accordance with the present invention may be implemented is illustrated in, and will be described with reference to, the schematic block diagram of FIG. 1. The present invention may be implemented in a conventional computer system 12, such as a single general purpose computer or a plurality of such computers networked or otherwise coupled together to perform the functions to be described herein. For example, the present invention may be implemented in the conventional computer systems currently used in television operations to generate, define, and/or present, either for recording or for live broadcast, video or multimedia presentations including computer generated or other scenes in which an on-screen presenter appears. The computer system 12 may be provided with conventional input devices 14, such as a keyboard, mouse, etc., and display devices 16, such as a computer monitor, to allow an operator of the system to interact with the computer programs implemented on the computer 12 to generate, define, and control presentation of a video or multi-media presentation as described herein.

Conventional memory 18 is provided as part of, or accessible by, the computer system 12. The memory 18, e.g., including disk memory, RAM, and/or ROM, etc., holds the various computer programs that are run on the computer system 12 to implement a scene launcher system and method in accordance with the present invention. Such software includes the scene launcher software 20 itself, which, as will be described in more detail below, includes graphical user interface software for defining presentation scenes in a build mode of operation, as well as software for controlling the launching of scenes by an on-screen presenter in a non-linear manner during the presentation of the presentation. The present invention preferably also employs software 22 for tracking a pointing element in a video field, e.g., for tracking the position of the hand of an on-screen presenter appearing in the presentation. Exemplary systems and methods for tracking a pointing element in a video field in this manner are described, for example, in U.S. Pat. Nos. 5,270,820, 5,699, 442, and 6,549,659, the details of which are incorporated herein by reference. Other systems and methods for tracking a pointing element in a video field also may be employed such as a touch sensitive screen interface of an infrared overlay. Memory 18 preferably also contains other conventional software programs necessary for general operation of the computer system 12. Based on the detailed functional description, flow chart diagrams, and exemplary screen displays provided herein, a person of ordinary skill in the art of software programming in the field of computer graphics and video or multi-media presentations will be able to implement a system and method in accordance with the present invention without undue experimentation.

A system 10 in accordance with the present invention may be connected to a site located at a specific geographic location 21. Such a remote site may be a fixed site, such as a sky camera or remote weather station site, having a known geographic location 21, or a moveable site, such as a weather/ storm chasing vehicle (such as a truck or helicopter) having a moving geographic location 21. In the later case, the geographic location 21 of the site may be provided continuously or periodically to the system 10 in accordance with the present invention such that the system 10 has the current or near current geographic location of the site. For example, a global positioning system (GPS) or other device in the vehicle may be used to obtain the current position of the vehicle. This current position information 21 (e.g., provided as a latitude/ longitude coordinate) may be forwarded to the system 10 in accordance with the present invention via an appropriate digital or analog communications channel (e.g., radio transmission, cellular telephone connection, etc.). Weather data and/or video images 23 also may be provided to the system 10 in accordance with the present invention from the remote site via the same or a different communications channel. Such data and/or video images 23 may be used to generate background scenes or other graphics for display as part of a presentation in accordance with the present invention.

As will be described in more detail below, a system 10 in accordance with the present invention is used to generate and present a video presentation composed of a series of scenes in which an on-screen presenter appears. The various scenes forming the presentation may be generated using computer graphics generation and other video generation techniques in a conventional manner and stored, e.g., in a scene database 24. The scenes forming the presentation may be conventional substantially two-dimensional background scenes, in which the presenter appears in front of the scene elements, or more three-dimensional scenes, in which scene objects may appear both behind and in front of the presenter. A system and method for generating three-dimensional scenes of this type is described, for example, in U.S. Pat. No. 6,335,765 to Daly, et al., entitled Virtual Presentation System and Method, the details of which are incorporated herein by reference. As also will be discussed in more detail below, using a build mode of operation provided by the computer system 12 an operator of the system defines the scenes of a video presentation incorporating a scene launcher method in accordance with the present invention. One or more presentations may be defined in this manner and stored in a presentation database 26.

During the presentation of a presentation employing a scene launcher method in accordance with the present invention an on-screen presenter 28 is positioned in front of a screen 30 having a pre-selected background color. A video image of the presenter 28 in front of the background color screen 30 is obtained in a conventional manner using a conventional video camera 32 and is provided, in digital format (e.g., using conventional analog-to-digital video conversion), to the computer system 12. Within the computer system 12 the video image of the presenter 28 in front of the background screen 30 is combined with video scenes by replacing picture elements (pixels) of the video image of the presenter 28 in front of the screen 30 having the background screen color with corresponding pixels of a video scene. The resulting combined video image, therefore, shows the presenter 28 in front of or as part of the scene. This combined image may be provided as a feedback to the presenter 28 on a conventional video monitor 34, positioned in the field of view of the presenter 28, so that the presenter 28 may coordinate his movements and positions with the scene in which the presenter 28 appears. This combined video image also may be broadcast 36 in a conventional manner, or recorded for broadcast at a later time.

In accordance with the present invention, the video image of the on-screen presenter 28 in front of the background color screen 30 preferably also is analyzed by the computer 12 using the pointing element tracking software 22 to track the position of a pointing element, e.g., the presenter's hand, in the video image field. A communication device 38 also is provided to the presenter 28, whereby the presenter 28 may send a signal to the computer system 12 while the presenter 28 appears onscreen as part of the presentation. The communication device 38 may be implemented, for example, as a hand-held device having one or more buttons. The communication device may also, or alternatively, include a foot pedal or other foot operated device. The communication device 38 may be coupled via a wired or wireless connection 40 to the computer system 12. Alternatively, tracking may be implemented using a touch sensitive panel, an infrared overlay, or any other method allowing tracking of the pointing element.

Figure 2:
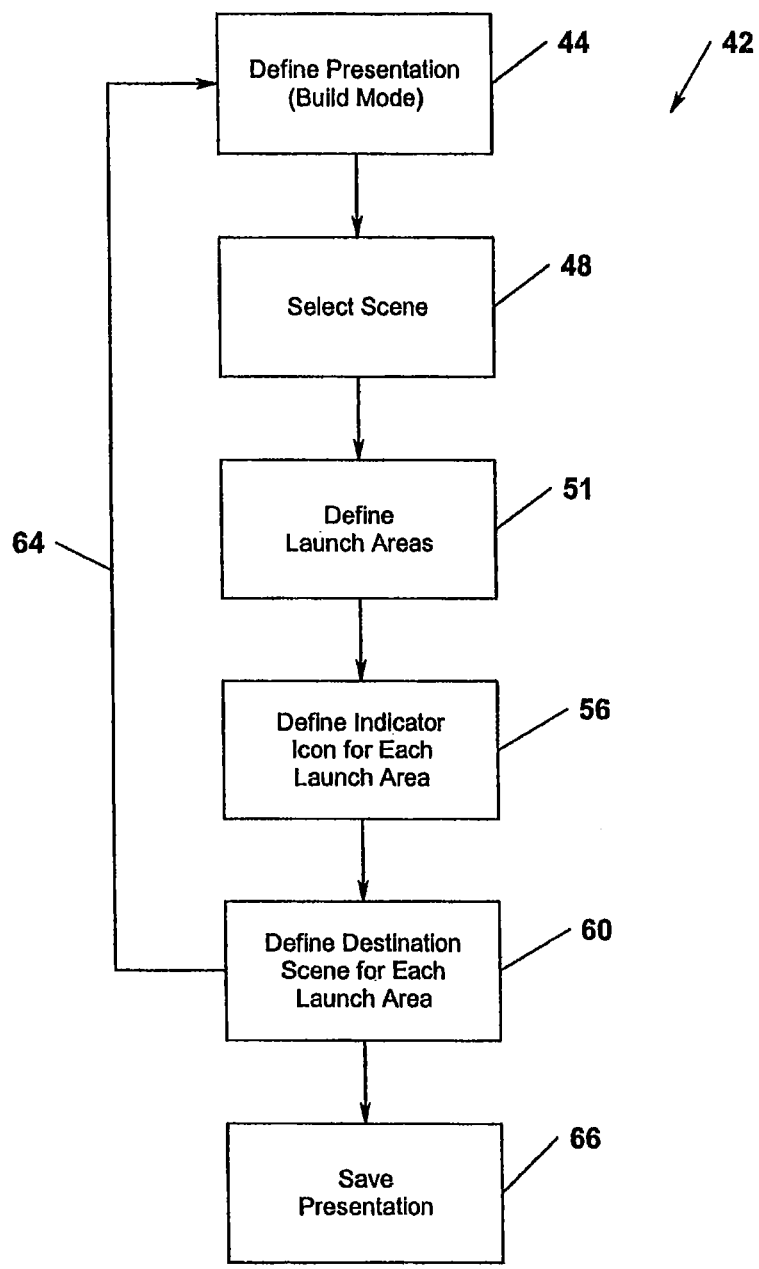
FIG. 2 is a flow chart diagram illustrating exemplary steps in a build mode of operation for defining the scenes forming a presentation incorporating a scene launcher method in accordance with the present invention.
Figure 3:
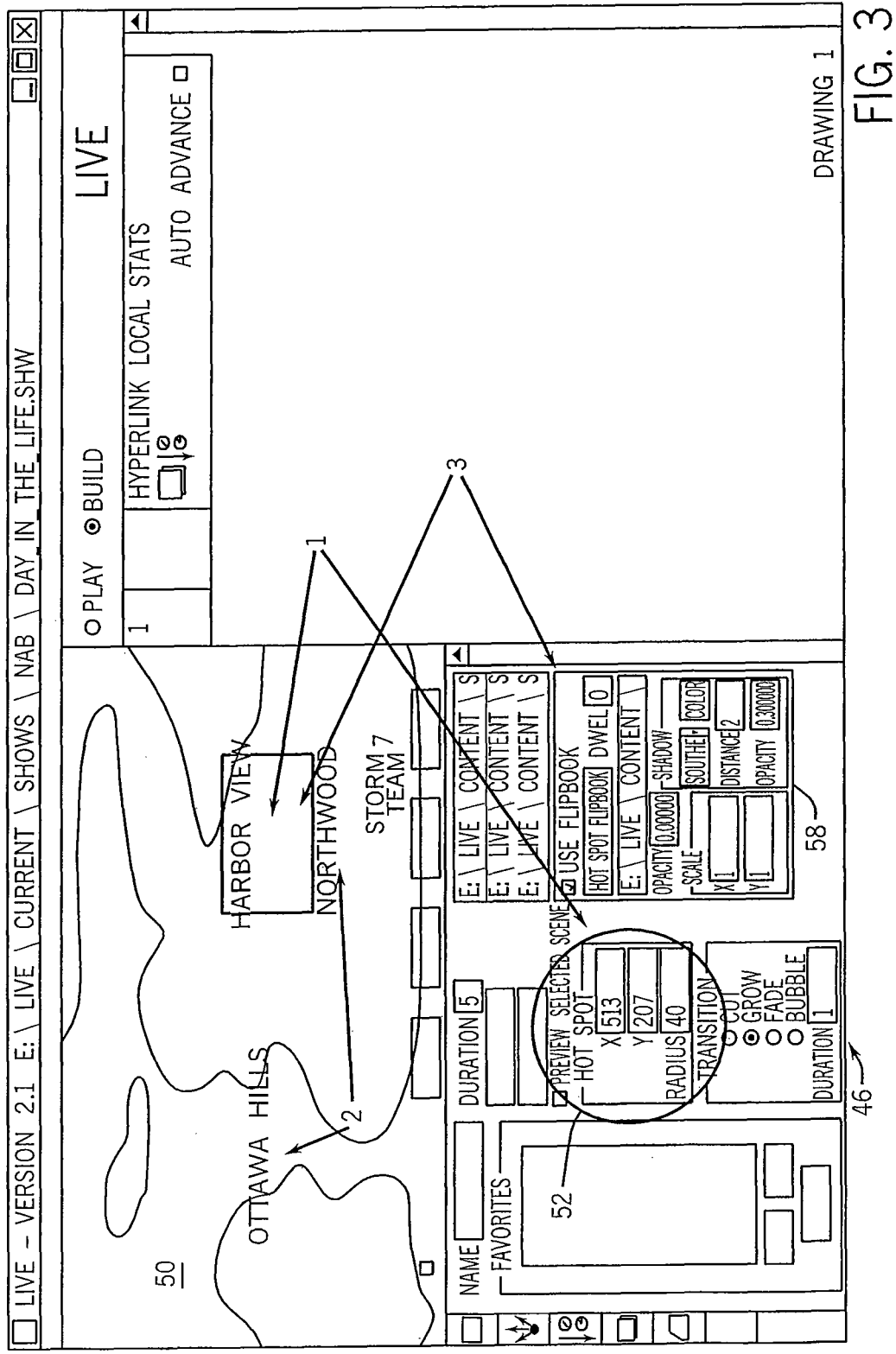
FIGS. 3-5 are exemplary screen shots illustrating an exemplary graphical user interface and use thereof during a build mode of operation to define and save the scenes forming an exemplary weather report presentation incorporating a scene launcher method in accordance with the present invention.
Figure 4:
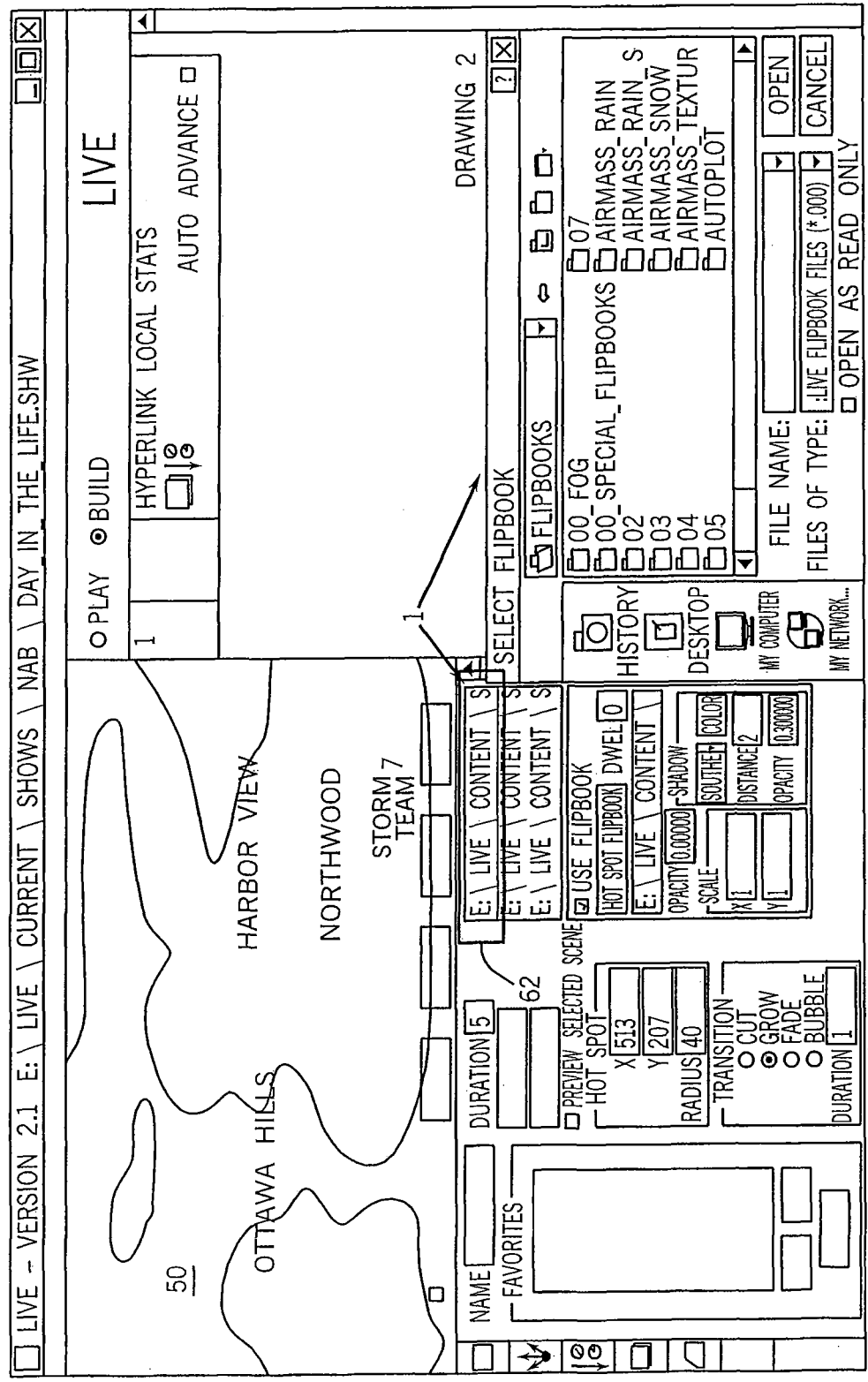
Figure 5:
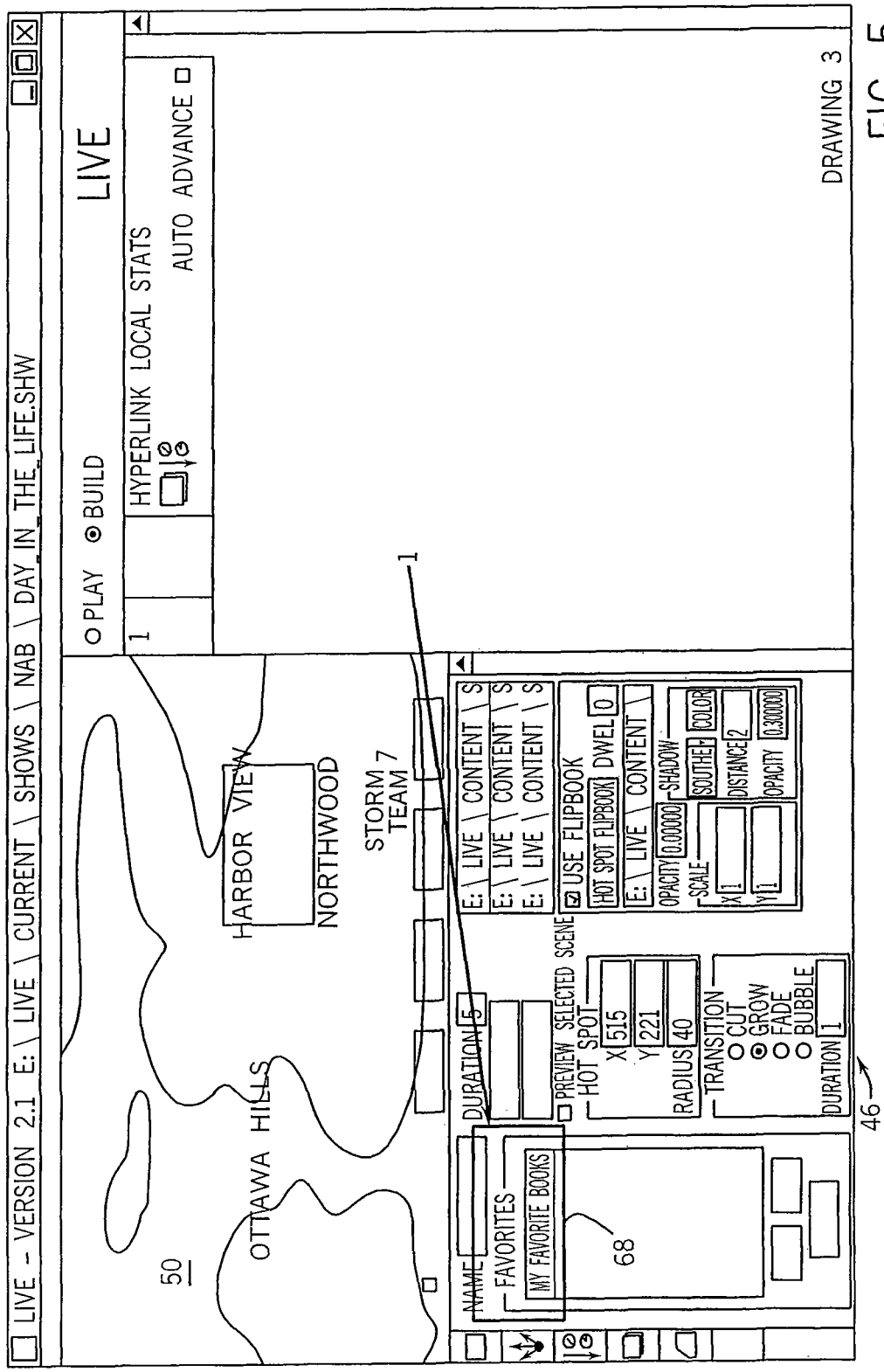

An exemplary method for defining the scenes of a presentation in which an on-screen presenter is able to control the sequence of displayed scenes forming the presentation in a non-linear manner using a scene launcher method in accordance with the present invention now will be described in detail with reference to the flow chart diagram 42 of FIG. 2 and the exemplary screen shots which follow in FIGS. 3-5. During the build mode of operation 44 an operator of the system employs a graphical user interface to select or define the scenes which will form the presentation, to define and establish launch areas within those scenes, and to associate destination scenes with each such defined launch area. An exemplary graphical user interface 46 for providing the build mode functionality described to an operator of the system is illustrated in the screen shots presented in FIGS. 3-5.

The operator first selects 48 or defines a first or initial scene for the presentation. The scene may be selected 48, for example, from available scenes stored in the scene database 24. For example, as illustrated in the exemplary screen shots of FIGS. 3-5, the first scene 50 may be a computer or otherwise generated digital still or video image of a geographic area over which weather information will be presented as part of a weather report presentation.

Within the first selected scene the operator defines 51 a plurality of launch areas. Each launch area may be defined by the operator, for example, by using the graphical user interface 46 to enter information 52 defining a position of a center of the launch area in the scene, e.g., as X and Y coordinates in the scene, or, for a geographical scene, as a lat./lon. coordinate, and the size of the launch area. Alternatively or additionally, the operator preferably may use an input device 14 such as a mouse and a conventional click and drag operation to locate and define the size of each launch area in the displayed scene. An exemplary launch area 54 in the first scene 50 as defined in this manner is illustrated in the exemplary screen shot of FIG. 3. It should be noted that each launch area thus defined may have any desired shape, size, and location, and each of these launch area parameters may be user definable.

For each launch area defined within a scene an indicator icon or flip book preferably is defined or assigned 56 thereto. As will be described in more detail below, during the presentation of the presentation including the scene, when the on-screen presenter moves a pointing element, e.g., his hand, into an area in space corresponding to a launch area in the scene an indicator flip book or icon preferably will appear on the presenter's monitor 34, thereby giving a visual indication that a launch area is located there and is being indicated by the on-screen presenter. The characteristics of the indicator flip book or icon may be defined by an operator using the graphical user interface 46 which preferably allows the operator to enter or select the appropriate parameters 58 defining the indicator icon or flip book, as illustrated, for example, in the exemplary screen shot of FIG. 3.

For each launch area defined in a scene a destination scene is defined 60 or selected and associated therewith. The destination scene is the scene that will be launched, i.e., that will come up to replace the current scene in which the on-screen presenter appears, when that launch area is selected by a presenter in the manner to be described in more detail below. The destination scene associated with each launch area may be defined, e.g., as an address location 62 of the destination scene in the system memory, e.g., in the scene database 24, using the graphical user interface 46 as illustrated, e.g., in the exemplary screen shot of FIG. 4. Each destination background scene may include, for example, a computer or otherwise generated still or video scene, e.g., another scene in a weather report presentation.

The build mode 44 procedure just described may be repeated 64 for one or more of the destination scenes from the first scene, to create launch areas with associated indicator icons or flip books and subsequent destination scenes for each thus defined launch area in the scenes. The collection of scenes and launch areas thus defined may be saved 66, e.g., in the presentation database 26, for recall and use during presentation of the presentation. Also, each of the individual scenes and the collection of launch areas and destination scenes associated with that scene may be saved as a favorite 68 for easy recall at a later time using the graphical user interface 46, as illustrated, for example, in the exemplary screen shot of FIG. 5.

Figure 6:
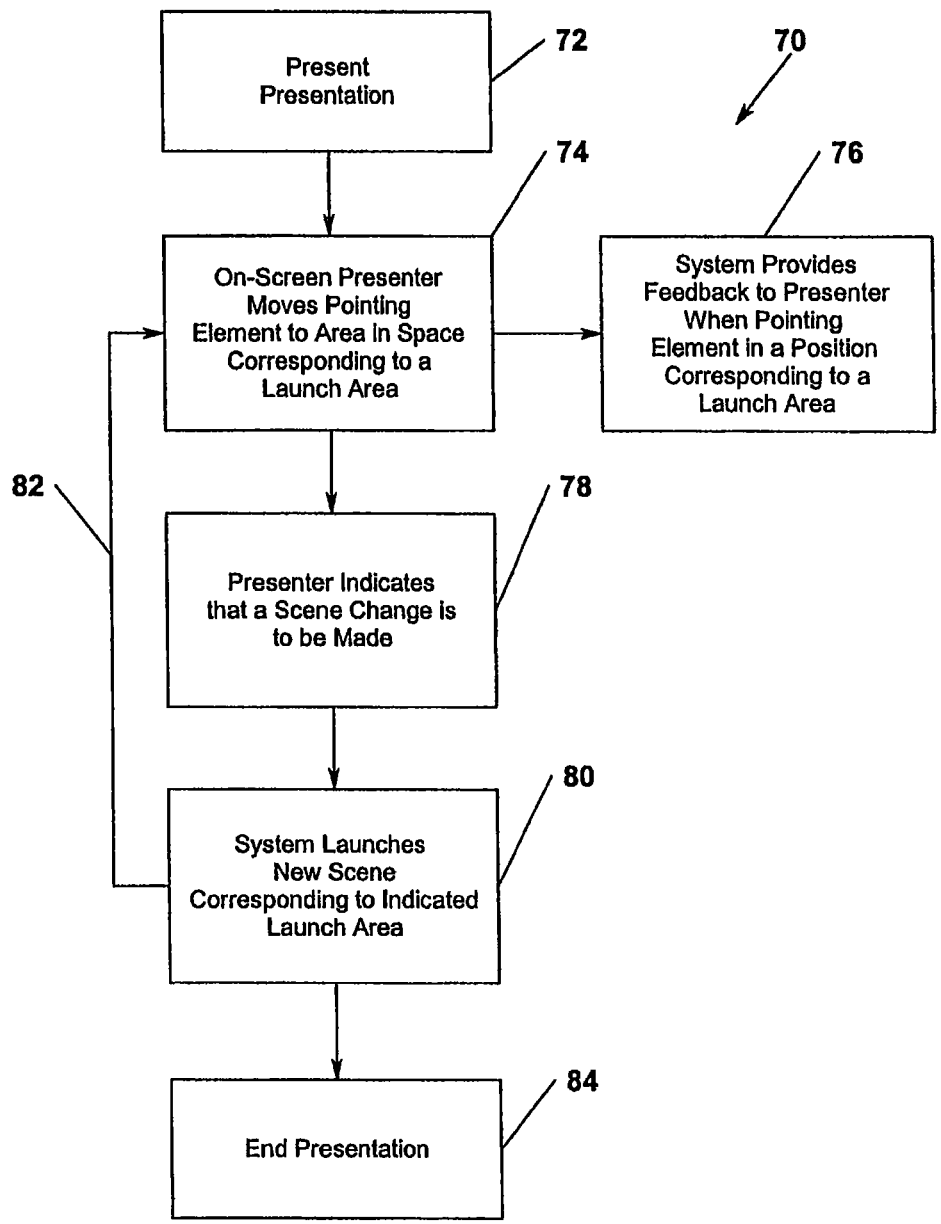
FIG. 6 is a flow chart diagram illustrating an exemplary method for presenting a video presentation using a scene launcher method in accordance with the present invention to control the sequence of scenes forming the presentation.
Figure 7:
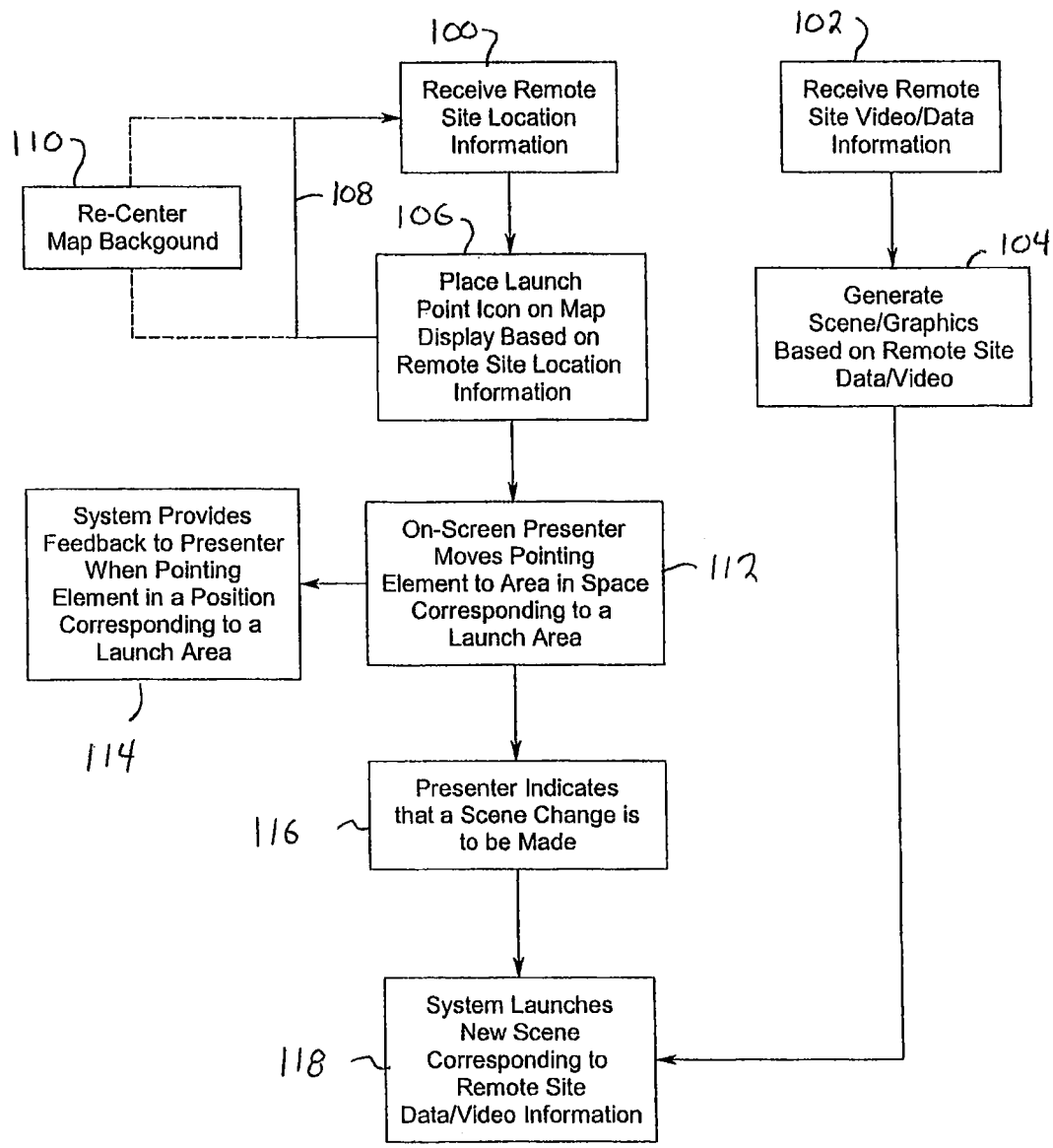
FIG. 7 is a flow chart diagram illustrating an exemplary method for presenting a video presentation using a scene launcher method in accordance with the present invention wherein the launch areas in a video scene are displayed on a map background in a location corresponding to a geographic location of a remote site.

An exemplary method for presenting 72 a video presentation employing a scene launcher method in accordance with the present invention will be described now with reference to the exemplary flow chart diagram 70 of FIG. 6. As an initial matter, the on-screen presenter 28 is positioned in front of the background color screen 30 and is provided with the communication device 38 as described earlier. The presentation scene definitions, as defined in the build mode 44, are retrieved from the presentation database 26 and the first or initial scene in the presentation is displayed with the on-screen presenter 28 appearing in front of or within the scene by combining the image of the presenter 28 in front of the background color screen 30 as provided by the video camera 32 with the first scene image in the conventional manner described above. This combined image is provided to the on-screen presenter 28 on the monitor 34 so that the presenter 28 can coordinate his movements and position in real space with his position in the scene using the feedback provided. The movement of a pointing element, e.g., the on-screen presenter's hand, controlled by the on-screen presenter 28, within the video image obtained by the camera 32, is tracked, e.g., using the pointing element tracking software 22 described above.

When the on-screen presenter 28 desires to transition to the next scene in a presentation, the presenter 28 moves 74 the pointing element, e.g., his hand, into an area in space corresponding to a launch area as defined in the displayed scene. The system provides feedback 76 to the presenter 28 on the monitor 34 by showing thereon the associated indicator icon or flip book when the presenter has positioned the pointing element in the appropriate position corresponding to a launch area.

With the pointing element positioned in a position corresponding to a launch area, the presenter indicates 78 that a scene change is to be made using the communication device 38, e.g., by depressing a button on the communication device to initiate a scene change signal that is provided to the computer system 12.

In response to the presenter's operation of the communication device 38 the system launches 80 a new scene, i.e., a new scene comes up to replace the existing scene. Thus, the presenter 28 now appears in the new scene selected. The specific scene that is launched 80 depends on the particular one of the plurality of launch areas defined in the previous scene which the on-screen presenter 28 was indicating at the time that the communication device 38 was operated to indicate that a scene change is to be made. Thus, in this manner, the onscreen presenter 28 is able to control both the timing of scene changes as well as the sequence of scene changes in a non-linear manner.

The process of indicating a launch area by positioning 74 a pointing element in the video field and indicating 78 that a scene change is to be made may be repeated by the presenter 28 for each currently displayed scene for which launch areas and their associated destination scenes have been defined as described above. The system may also allow the on-screen presenter 28 to return to the last previously viewed scene by indicating such a scene change is desired using the communication device 38, e.g., by pushing the appropriate button on the communication device 38. Thus, the on-screen presenter may have full control of the scene sequence and presentation flow throughout the duration of the presentation until the end of the presentation 84. The presentation thus provided using a scene launcher method in accordance with the present invention may be broadcast 36 or otherwise transmitted live to viewers and/or recorded or otherwise saved for future viewing.

In an alternative embodiment of a scene launcher method in accordance with the present invention the launch area in a current scene is defined by the geographical location of a remote site or position. As discussed above, the remote site may be a fixed or moveable location. For a moveable location, such as a storm chasing vehicle, position information 21 may be received 100 from the remote location during a presentation. Video and/or other data information 23 may also be received 102 from the remote site and used to generate 104 a background scene or other graphics to be displayed as part of the presentation.

Based on the remote position information 21 that is received 100 from the remote site a launch area is defined 106 in the video scene at a location in a map background scene corresponding to the position information 21. For example, an appropriate scene launch area icon may be positioned in the map background scene at a location thereon corresponding to the latitude and longitude of the remote site as received from the remote site. Any type of graphic indicator of the launch area may be used. For example, if the remote site is a storm chasing truck an icon representing a truck may be used.

For a moveable remote site location the current site position may continuously or repeatedly 108 be sent to and received 100 by the system 10 and the position of the launch area icon updated 106 in response to the received 100 position information 21. Thus, the position of the launch area and any associated icon may move across the map background scene as, for example, the vehicle represented thereby, moves in real space. Alternatively, the launch area and associated icon may remain in a fixed position in the video field with the map background scene continuously re-centered 110 such that the map background moves behind the launch area and icon to keep the launch area and icon in the proper position on the map background corresponding to the position in real space of the remote site.

During the presentation of a presentation in accordance with the present invention the on-screen presenter may move 112 a pointing element to an area in the video field corresponding to a launch area defined geographically in this manner. The pointing element is tracked in the video field, as described above, such that the system detects when the pointing element is in a portion of the video field corresponding to such a launch area. The system may provide 114 an indication to the presenter that the pointing element is in a position corresponding to such a launch area, such as by changing the size, color, and/or other characteristic of the icon corresponding to the launch area.

With the pointing element positioned in an area of the video field corresponding to the launch area, the presenter 28 indicates 116 that a scene change is to be made, e.g., by operation of the hand-held 38 or other device. In response to this indication 116 a new background scene 118 is launched. This new background scene may preferably be a background scene that was generated 104 based on data and/or video information 23 received from the remote site. It may be noted that such a background scene may be partially or fully defined automatically by the system, with or without operator intervention, either before or after the presenter 28 indicates that such a scene is to be launched.

Figure 8:
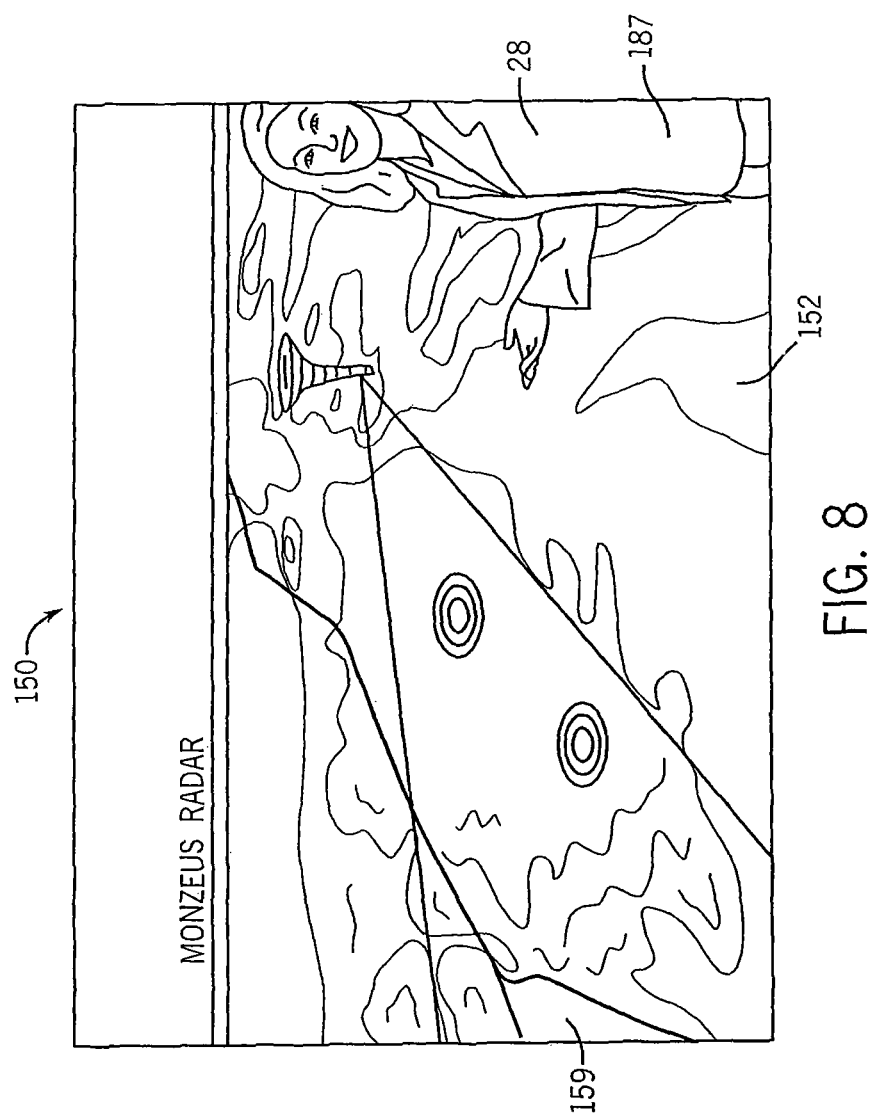
FIG. 8 is an exemplary graphic display illustrating the automatic positioning of the display of presentation scene graphics and key scene elements in positions of a video field such that the key scene graphics are not blocked by an on-screen presenter.

In accordance with the present invention, a background scene or other graphic display may be launched in a position in the video field of a presentation such that key elements of the scene or graphic display are not blocked by the on screen presenter at the time of launch. As illustrated in FIG. 8, this is accomplished in accordance with the present invention by determining the position of the presenter 28 in the video field 150 so as to define an area 152 of the video field in which the presenter is not located. New video scenes or other graphics may then be launched in a position with respect to the defined area 152 of the video field where the presenter 28 is determined not to be located such that key elements of the scene or graphics are not blocked by the presenter 28.

Figure 9:
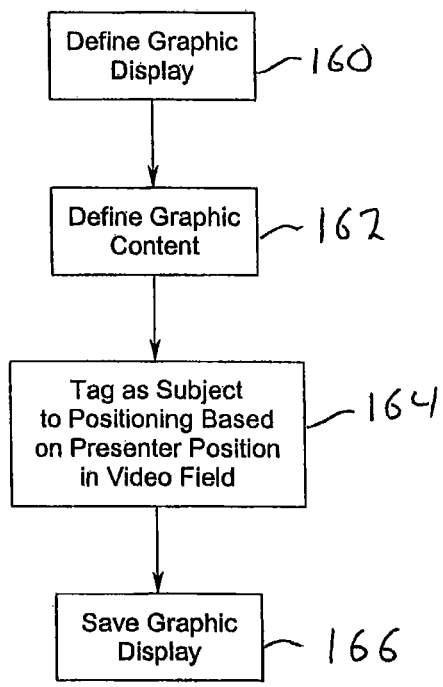
FIG. 9 is a flow chart diagram of an exemplary method for defining a graphic display to be positioned automatically in a video field such that the graphic display is not blocked by an on-screen presenter when displayed.

Positioning of graphics or entire background scenes forming part of a presentation in accordance with the present invention in this manner may be performed for all graphics and scenes to be displayed as part of a presentation, or for only selected scenes and graphics. For example, the flow chart diagram of FIG. 9, illustrates an exemplary method for defining 160 a graphic to be displayed in a position in the video field based on the presenter position in the video field. The content 162 of the graphic display is defined in a conventional manner. The graphic display is then tagged 164 to indicate that the graphic display is to be launched in a position in the video field based on the position of the on-screen presenter in the video field. The graphic display defined 160 in this manner is then saved 166 for use during the presentation.

Figure 10:
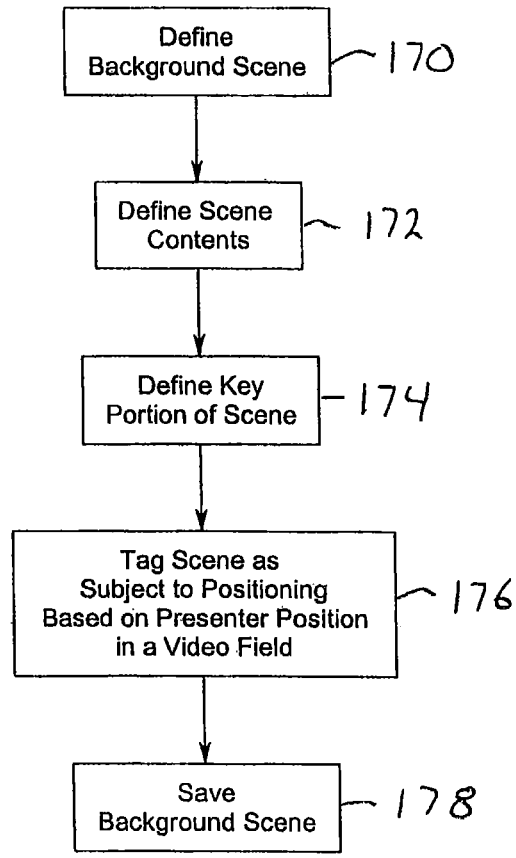
FIG. 10 is a flow chart diagram of an exemplary method for defining a background scene to be positioned automatically in a video field such that key elements of the background scene are not blocked by an on-screen presenter when displayed.
Figure 11:
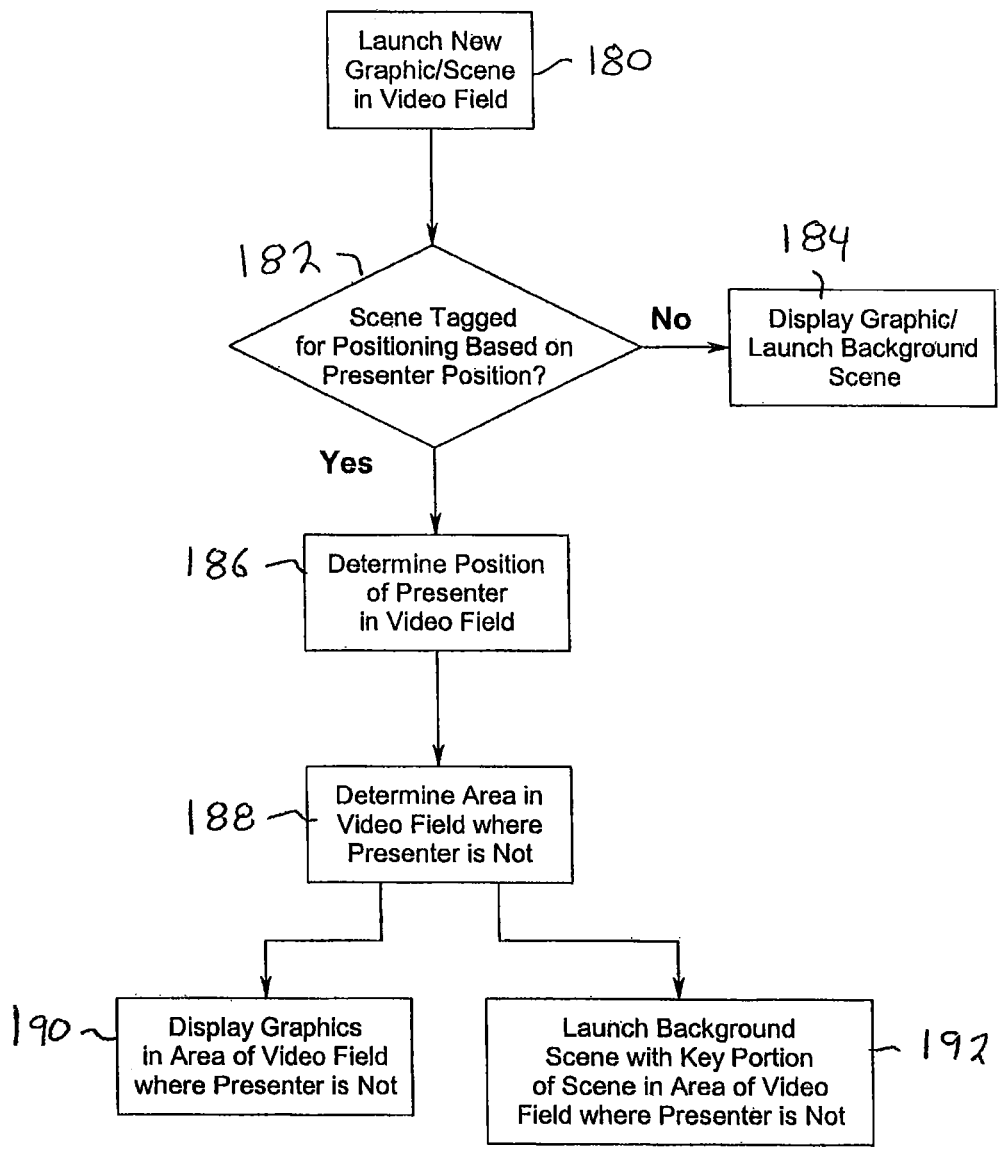
FIG. 11 is a flow chart diagram of an exemplary method in accordance with the present invention for displaying a background scene or other graphic display in a video field such that key elements of the background scene or graphic display are not blocked by an on-screen presenter when displayed.

The flow chart diagram of FIG. 10 illustrates an exemplary method for defining 170 a background scene to be positioned in a video field based on the position of the presenter in the video field. The contents 172 of the scene may be defined in a conventional manner. The area of the scene thus defined that represents the key area thereof, that is, the area of the background scene that should not be blocked by an on screen presenter is then defined 174. The scene defined in this manner is then tagged 176 as a scene that is to be positioned in the video field based on a presenter's position in the video field, and saved 178 for use during the presentation.

As by the flow chart diagram of FIG. II, in accordance with the present invention, each time that a new scene or graphic is launched 180 as part of a presentation a determination is made as to whether 182 the scene or graphic launched is subject to positioning based on a presenter's position in the video field.

(This may apply whether the new scene or graphic is launched by the on-screen presenter or by an off-screen operator.) If the new scene or graphic is not tagged for positioning based on the presenter's position in the video field the scene or graphic may be launched 184 in the conventional manner and position as may be previously defined for the scene or graphic.

If the scene or graphic to be launched is determined 182 to be subject to positioning based on the position of a presenter in the video field, the position of the presenter in the video field at the time of the scene or graphic launch is determined 186. The position of the presenter in the video field may be determined by determining a center line 187 of the presenter 28 in the video field (see FIG. 1). A method for determining the center line location of a presenter in a video field is described in U.S. Pat. No. 5,270,820, the disclosure of which is incorporated herein by reference. A more preferred method for determining the position of the presenter in the video field is to determine the "center of mass" of the picture elements corresponding to the presenter in the video field. Any other known current or future method for determining the presenter position in the video field may also or alternatively be used.

Once the position of the presenter 28 in the video field is determined 186 an area 152 of the video field where the presenter 28 is not is determined 188. This may be accomplished by dividing the video field in half or by some other division. If, for example, the center line 187 indicates that the presenter 28 is in the right half, or most right other division, of the video field, then the left half of the video field, or all divisions to the left of the division containing the center line 187, represents the portion 152 of the video field where the presenter is not.

After determining where in the video field the presenter is not, a graphics display may be presented 190 in this portion of the field without fear that the graphic will be blocked by the presenter 28. Similarly, a background scene may be launched 192 in a position in the video field such that the defined key elements of the scene are positioned in the portion 152 of the video field where the presenter 28 is not. Thus, the presenter need not be concerned that key information to be displayed will come up in the presentation behind the presenter, causing the presenter to have to scurry quickly out of the way.

It should be understood that the present invention is not limited to the particular exemplary applications and embodiments illustrated and described herein, but it embraces such modified forms thereof as come within the scope of the following claims. In particular, it should be noted that the present invention is not limited to the particular order or sequence of 5 steps for defining or presenting a video presentation using a scene launcher method as illustrated and described herein.

What is claimed is:

1. A computer-implemented method of defining and presenting a presentation including a plurality of scenes and a presenter appearing in the scenes, comprising:
   (a) defining a first scene including a geographic background;
   (b) receiving geographic location information and remote video and/or data information from a remote site;
   (c) defining within the first scene a launch area at a location within the geographic background corresponding to the geographic location information;
   (d) associating a destination scene with the defined launch area;
   (e) obtaining a video image of the presenter;
   (f) combining the video image of the presenter with the first scene such that the presenter appears in the first scene;
   (g) tracking a location of a pointing element controlled by the presenter in the first scene; and
   (h) displaying the destination scene in place of the first scene when the presenter provides a scene change signal with the pointing element located at the defined launch area in the first scene, wherein the destination scene displayed is a background scene generated based on remote video and/or data information received from the remote site.

2. The method of claim 1, wherein the presentation is a weather report presentation and wherein the first scene is a geographic area scene upon which weather information is presented.

3. The method of claim 1, wherein the first scene is a computer generated scene.

4. The method of claim 1, wherein obtaining a video image of the presenter includes obtaining a video image of the presenter positioned in front of a background color screen and wherein combining the video image of the presenter with the first scene includes replacing picture elements of the video image of the presenter having the background color with corresponding picture elements of the first scene.

5. The method of claim 1, wherein tracking a location of a pointing element controlled by the presenter includes analyzing the video image of the presenter to determine the location of the pointing element therein.

6. The method of claim 5, wherein the pointing element is a part of the presenter's body.

7. The method of claim 1, further comprising associating an indicator with each defined launch area and displaying the indicator associated with a launch area to the presenter when the presenter controls the location of the pointing element to a location corresponding to the launch area.

8. The method of claim 1, further comprising moving a position of the launch area automatically in response to changing received location information from the remote site.

9. The method of claim 1, further comprising re-centering the geographic background scene automatically in response to changing received location information from the remote site.

10. The method of claim 1, further comprising:
    (a) receiving information from the remote site; and
    (b) defining the destination scene based on the information received from the remote site.

11. The method of claim 1, wherein the presenter provides the scene change signal using one of a hand held communication device, utilization of a touch screen, and utilization of an infrared overlay.

12. A computer-implemented system for defining and presenting a presentation including a plurality of scenes and a presenter appearing in the scenes, comprising:
    (a) a computer-implemented scene generation engine configured to generate the presentation by performing a plurality of steps, the steps including:
       (1) defining a first scene including a geographic background,
       (2) receiving geographic location information for a remote site,
       (3) defining within the first scene a launch area at a location within the geographic background corresponding to the geographic location information,
       (4) associating a destination scene with the defined launch area,
       (5) obtaining a video image of the presenter,
       (6) combining the video image of the presenter with the first scene such that the presenter appears in the first scene, and
       (7) tracking a location of a pointing element controlled by the presenter in the first scene; and (b) a computer-implemented remote scene generation engine configured to generate the geographic location information and the destination scene based on video and/or data information obtained at the remote site, wherein the computer-implemented scene generation engine is further configured for displaying the destination scene in place of the first scene when the presenter provides a scene change signal with the pointing element located at the defined launch area in the first scene.

13. The system of claim 12, wherein the presentation is a weather report presentation and wherein the first scene is a geographic area scene upon which weather information is presented.

14. The system of claim 12, wherein the first scene is a computer generated scene.

15. The system of claim 12, wherein obtaining a video image of the presenter includes obtaining a video image of the presenter positioned in front of a background color screen and wherein combining the video image of the presenter with the first scene includes replacing picture elements of the video image of the presenter having the background color with corresponding picture elements of the first scene.

16. The system of claim 12, wherein tracking a location of a pointing element controlled by the presenter includes analyzing the video image of the presenter to determine the location of the pointing element therein.

17. The system of claim 16, wherein the pointing element is a part of the presenter's body.

18. The system of claim 12, wherein the computer-implemented scene generation engine is further configured to move a position of the launch area automatically in response to changing received location information from the remote site.

19. The system of claim 12, wherein the computer-implemented scene generation engine is further configured to re-center the geographic background scene automatically in response to changing received location information from the remote site.

20. The system of claim 12, wherein the system receives the scene change signal from one of a hand held communication device, a touch screen, and an infrared overlay.

* * * * *